United States Patent
Hasek

(10) Patent No.: US 11,095,928 B2
(45) Date of Patent: *Aug. 17, 2021

(54) POLICY MANAGEMENT ARBITRATION BY SERVICE GROUP

(71) Applicant: Time Warner Cable Enterprises LLC, St. Louis, MO (US)

(72) Inventor: Charles Hasek, Broomfield, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 212 days.

This patent is subject to a terminal disclaimer.

(21) Appl. No.: 16/237,807

(22) Filed: Jan. 2, 2019

(65) Prior Publication Data
US 2019/0273953 A1  Sep. 5, 2019

Related U.S. Application Data

(63) Continuation of application No. 12/622,825, filed on Nov. 20, 2009, now Pat. No. 10,298,977.

(51) Int. Cl.
*H04N 21/239* (2011.01)
*H04N 21/6377* (2011.01)
*H04N 21/222* (2011.01)

(52) U.S. Cl.
CPC ..... *H04N 21/2396* (2013.01); *H04N 21/6377* (2013.01); *H04N 21/2221* (2013.01)

(58) Field of Classification Search
CPC ........... H04N 21/2396; H04N 21/6377; H04N 21/2221

USPC .......................................................... 705/51
See application file for complete search history.

(56) References Cited

U.S. PATENT DOCUMENTS

| | | |
|---|---|---|
| 6,721,789 B1 | 4/2004 | DeMoney |
| 7,340,759 B1* | 3/2008 | Rodriguez ......... H04N 21/2385 348/E5.002 |
| 7,924,451 B2 | 4/2011 | Hirooka |
| 7,975,283 B2 | 7/2011 | Bedingfield, Sr. |
| 8,032,914 B2* | 10/2011 | Rodriguez ......... H04N 21/6125 725/97 |
| 10,298,977 B2 | 5/2019 | Hasek |

(Continued)

OTHER PUBLICATIONS

Reininger et al., A Dynamic Quality of Service Framework for Video in Broadband Networks, IEEE network, pp. 22-34, Dec. 1998 (Year: 1998).*

(Continued)

*Primary Examiner* — James D Nigh
(74) *Attorney, Agent, or Firm* — Otterstedt, Wallace & Kammer, LLP

(57) ABSTRACT

A request is received from one of a plurality of terminals in a service group of a video content network. The request is to establish a session with a head end of the network. The video content network provides at least first and second different categories of sessions to the service group. The request is evaluated against a policy. The policy specifies a maximum utilization threshold for sessions of the first category and a maximum utilization threshold for sessions of the second category. The request is granted if it is in conformance with the policy. The method may be carried out, for example, with a session resource manager apparatus.

17 Claims, 14 Drawing Sheets

(56) References Cited

U.S. PATENT DOCUMENTS

| | | |
|---|---|---|
| 2001/0025310 A1* | 9/2001 | Krishnamurthy ... H04L 12/1471 709/223 |
| 2002/0027894 A1 | 3/2002 | Arrakoski |
| 2002/0100059 A1 | 7/2002 | Buehl et al. |
| 2003/0046704 A1 | 3/2003 | Laksono et al. |
| 2003/0056217 A1 | 3/2003 | Brooks |
| 2005/0188415 A1* | 8/2005 | Riley ...................... H04L 47/70 725/116 |
| 2005/0289618 A1 | 12/2005 | Hardin |
| 2007/0113246 A1 | 5/2007 | Xiong |
| 2008/0101460 A1* | 5/2008 | Rodriguez ......... H04N 21/6118 375/240.01 |
| 2008/0134165 A1 | 6/2008 | Anderson et al. |
| 2008/0244667 A1* | 10/2008 | Osborne ............ H04N 21/2396 725/94 |
| 2009/0193486 A1 | 7/2009 | Patel et al. |
| 2010/0086020 A1* | 4/2010 | Schlack ............. H04N 21/2402 375/240.01 |
| 2011/0219411 A1 | 9/2011 | Smith |
| 2011/0277008 A1 | 11/2011 | Smith |

OTHER PUBLICATIONS

Crinon et al., "Data Broadcasting and Interactive Television", 2006 IEEE, pp. 102-118, Proceedings of the IEEE, vol. 94, No. 1, Jan. 2006 (Year: 2006).*

Badih, "IPTV over Wimax: Overview on the video path from the server to the Wimax end-user", pp. 17-23, IEEE, Jun. 13, 2008 (Year: 2008).*

* cited by examiner

FIG. 8

| VOD SERVICE GROUP – 4 RF CHANNELS | | | | QAM BANDWIDTH | |
|---|---|---|---|---|---|
| QAM 1 | QAM 2 | QAM 3 | QAM 4 | Mbps | |
| 28 | 32 | 36 |  | 37.5 | ↑ |
| 27 | 31 | 35 | 37 | 33.75 | HD RATE |
| 26 | 30 | 34 |  | 30 | 15 Mbps |
| 25 | 29 | 33 |  | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

SD  3.75 Mbps       HD  15 Mbps

FIG. 9

| VOD SERVICE GROUP – 4 RF CHANNELS | | | | QAM BANDWIDTH | |
|---|---|---|---|---|---|
| QAM 1 | QAM 2 | QAM 3 | QAM 4 | Mbps | |
| 30 |  |  | 34 | 37.5 | ↑ |
| 28 | 26 | 29 | 33 | 33.75 | HD RATE |
| 27 |  |  | 32 | 30 | 15 Mbps |
| 25 |  |  | 31 | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

SD  3.75 Mbps       HD  15 Mbps

*FIG. 12A*

```
<QAMServicePolicy>
    <QAM Name = "QAM1" service = "VOD"/>
    <QAM Name = "QAM2" service = "SDV"/>
    <QAM Name = "QAM3" service = "SRVx"/>
    <QAM Name = "QAM4" service = "VOD,SDV"/>
    <QAM Name = "QAM5" service = "VOD,SRVx"/>
    <QAM Name = "QAM6,7,8,9" service = "SRVx"/>
    <QAM Name = "QAM10" service = "ALL"/>
            .
            .
            .
    <QAM Name = "QAMn" service = "x"/>
    <QAM Name = "FREQ=575" service = "ALL"/>
            .
            .
            .
    <QAM Name = "FREQ=n" service = "x"/>
</QAMServicePolicy>
```

FIG. 12B

See below: Limits are Mbps
<ProductPolicy>
  <Threshold_List>
    <ServiceGroup application="all" />
    <Threshold productName="FOD" limit_thresh="15" />
    <Threshold productName="SVOD" limit_thresh=37.5" />
    <Threshold productName="HDOD" limit_thresh="15" />
  </Threshold_List>
  <Threshold_List>
    <ServiceGroup application="2,3,5">
    <Threshold productName="MOD" limit_thresh="22.5" />
    <Threshold productName="SDVHD" limit_thresh="No_Limit" />
    <Threshold productName="AOD" limit_thresh="15" />
  </Threshold_List>
</ProductPolicy>

FIG. 12C

```
<AllocationAlgorithms>
    <AlgorithmTypeDef>
        <Type="01" AlgorithmType1 name="Tertis" />
        <Type="02" AlgorithmType2 name="TWCStacking" />
        <Type="03" AlgorithmType3 name="Foo" />
    </AlgorithmTypeDef>
    <AllocationAssignment>
        <Assign_QAM_Group="1" AlgoType="01" ServiceGroupAppl="1,2,3" />
        <Assign_QAM_Group="2" AlgoType="02" ServiceGroupAppl="4,5,6" />
    </AllocationAssignment>
</AllocationAlgorithms>
```

POLICY MANAGEMENT ARBITRATION BY SERVICE GROUP

CROSS REFERENCE TO RELATED APPLICATION

This application is a continuation of U.S. patent application Ser. No. 12/622,825, filed Nov. 20, 2009, the contents of which are hereby expressly incorporated by reference herein in their entirety for all purposes.

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

A video content network, such as a cable television network, may provide many different services; for example, free on demand, movies on demand, subscription video on demand, switched digital video, and the like. Sessions within each of these services require limited resources. Each type of service may be associated with a different fee structure.

SUMMARY OF THE INVENTION

Techniques are provided for policy management arbitration by service group.

In one aspect, an exemplary method includes the step of receiving, from one of a plurality of terminals in a service group of a video content network, a request to establish a session with a head end of the network. The video content network provides at least first and second different categories of sessions to the service group. An additional step includes evaluating the request against a policy. The policy specifies a maximum utilization threshold for sessions of the first category and a maximum utilization threshold for sessions of the second category. A further step includes granting the request if it is in conformance with the policy.

In another aspect, an exemplary session resource manager apparatus is configured to communicate over a video content network with a plurality of terminals in a service group of the video content network. The video content network has a head end. The apparatus includes a memory, and at least one processor, coupled to the memory, and operative to carry out method steps just described, or facilitate their being carried out.

In still another aspect, an exemplary system includes a video content network; a head end coupled to the video content network; a service group coupled to the video content network and having a plurality of terminals; and a session resource manager apparatus, of the kind described, coupled to the video content network.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may have one or more of the following advantages:

effective and efficient management of existing resources
effective and efficient management of new services These and other features and advantages of the invention will become apparent from the following detailed description of illustrative embodiments thereof, which is to be read in connection with the accompanying drawings.

BRIEF DESCRIPTION OF THE DRAWINGS

FIG. 8 shows a first exemplary session allocation;

FIG. 9 shows a second exemplary session allocation;

FIGS. 12A-12C depict an exemplary data file showing parameters that can be used to set a policy.

DETAILED DESCRIPTION OF PREFERRED EMBODIMENTS

Figure 1:
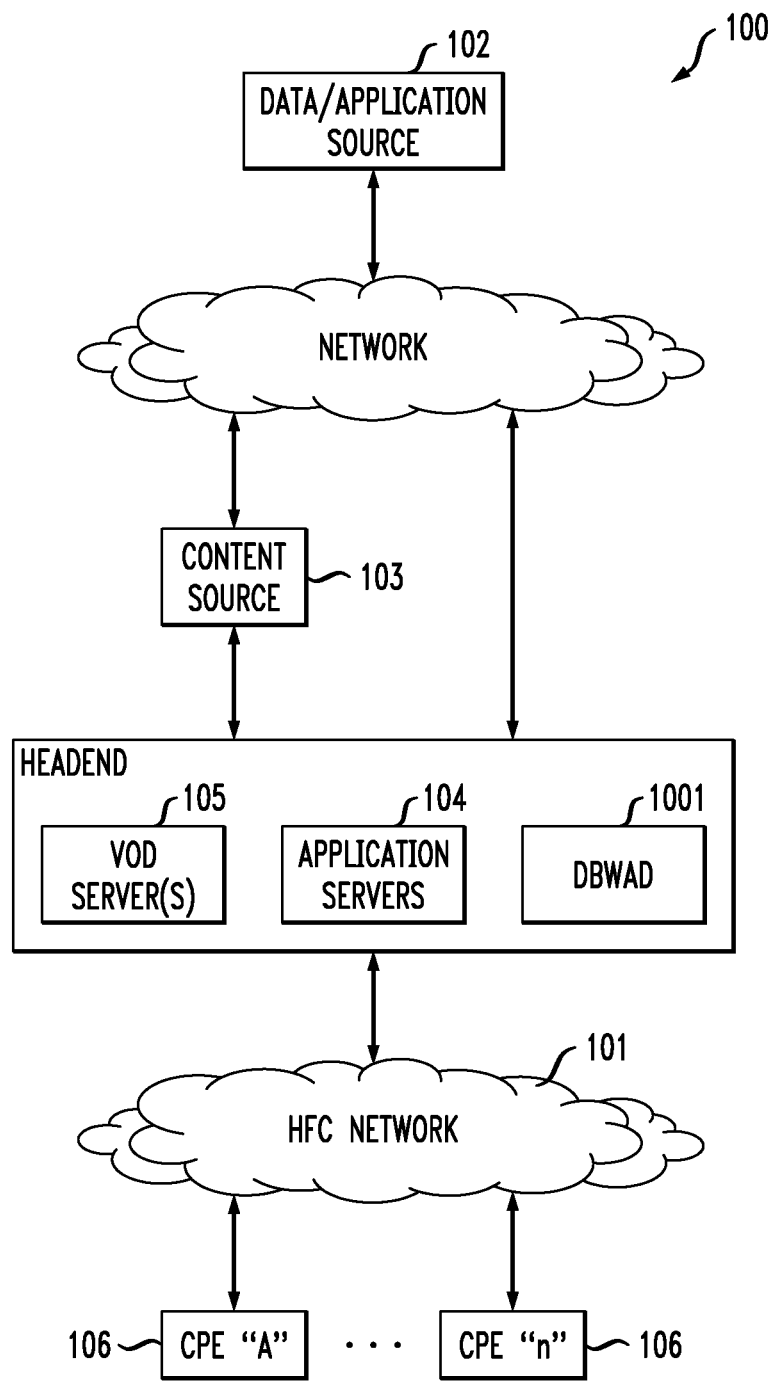
FIG. 1 is a functional block diagram illustrating an exemplary hybrid fiber-coaxial (HFC) network configuration useful with one or more embodiments of the present invention.

FIG. 1 illustrates a typical content-based network configuration 100 with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a global session resource manager 302, which is a non-limiting example of a session resource manager, as discussed elsewhere herein. The distribution server(s) 104, VOD servers 105, GSRM 302, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

It should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 1A:
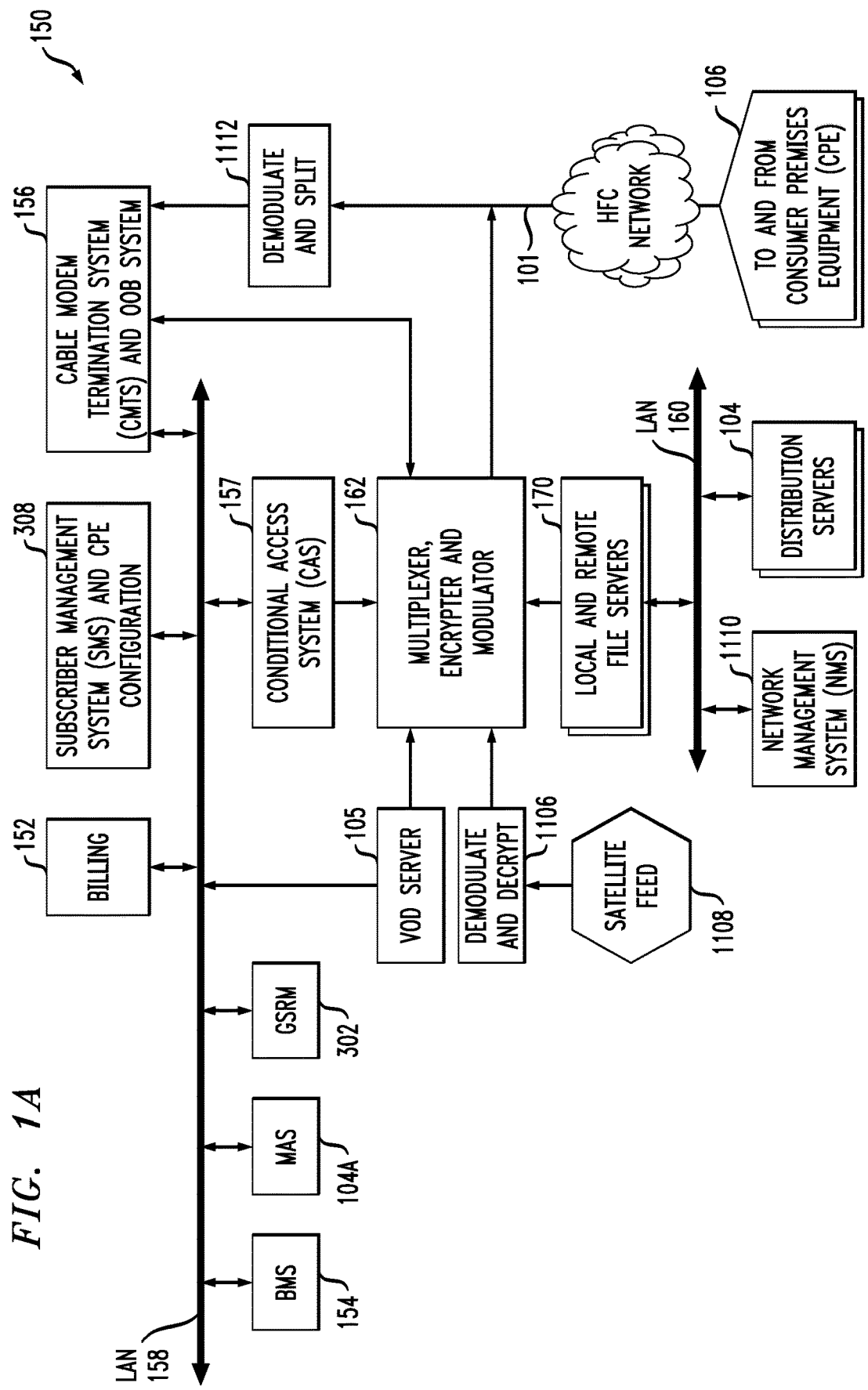
FIG. 1a is a functional block diagram illustrating one exemplary HFC cable network head-end configuration useful with one or more embodiments of the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1a is high-level, conceptual architecture and that each multi-service operator or multiple system operator (MSO) may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1*b*) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1*a* are a global session resource manager (GSRM) 302, a Mystro Application Server 104A, and a business management system 154, all of which are coupled to LAN 158, and discussed further below. GSRM 302 is a non-limiting example of a session resource manager.

Figure 1B:
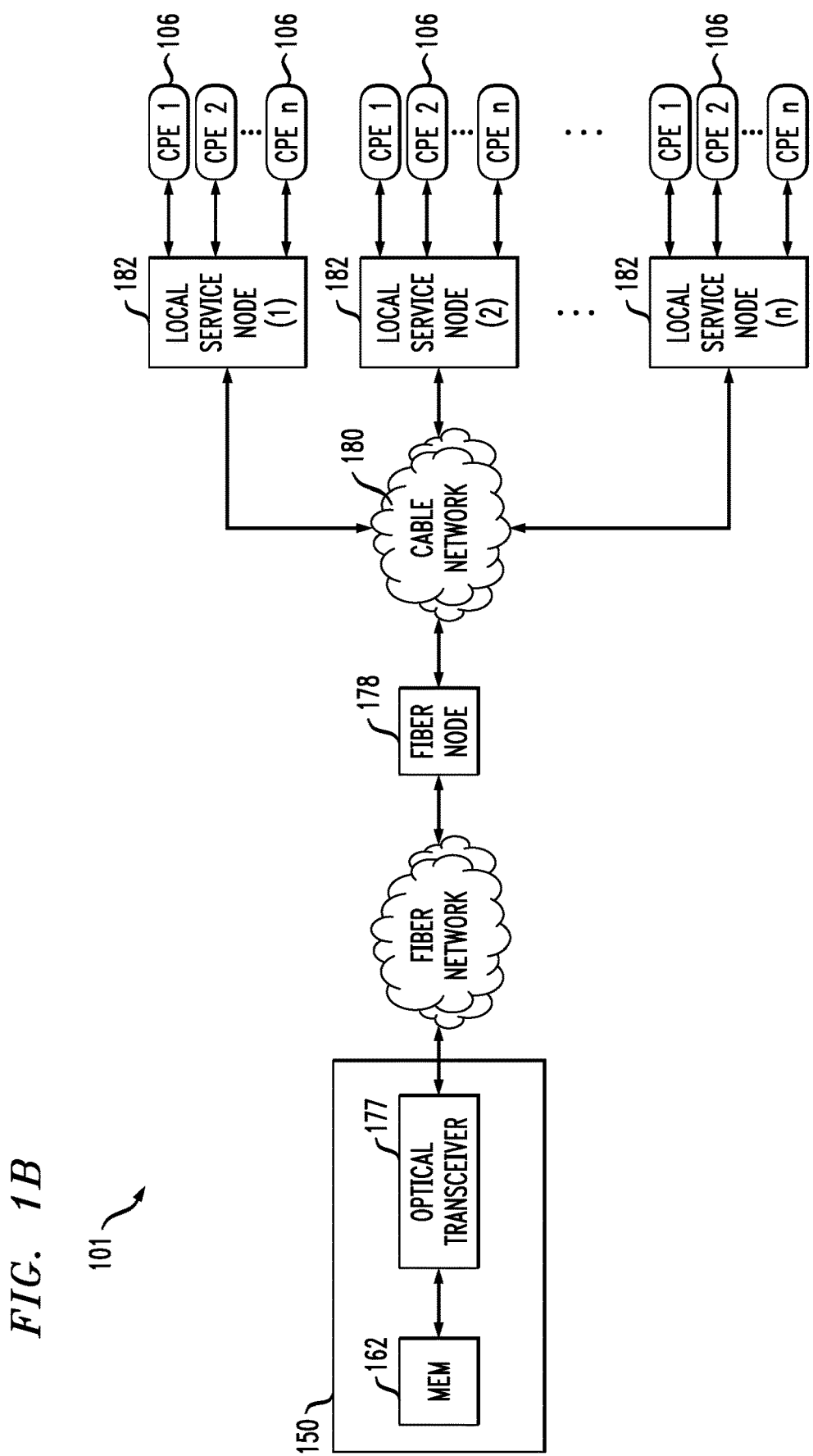
FIG. 1b is a functional block diagram illustrating one exemplary local service node configuration useful with one or more embodiments of the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
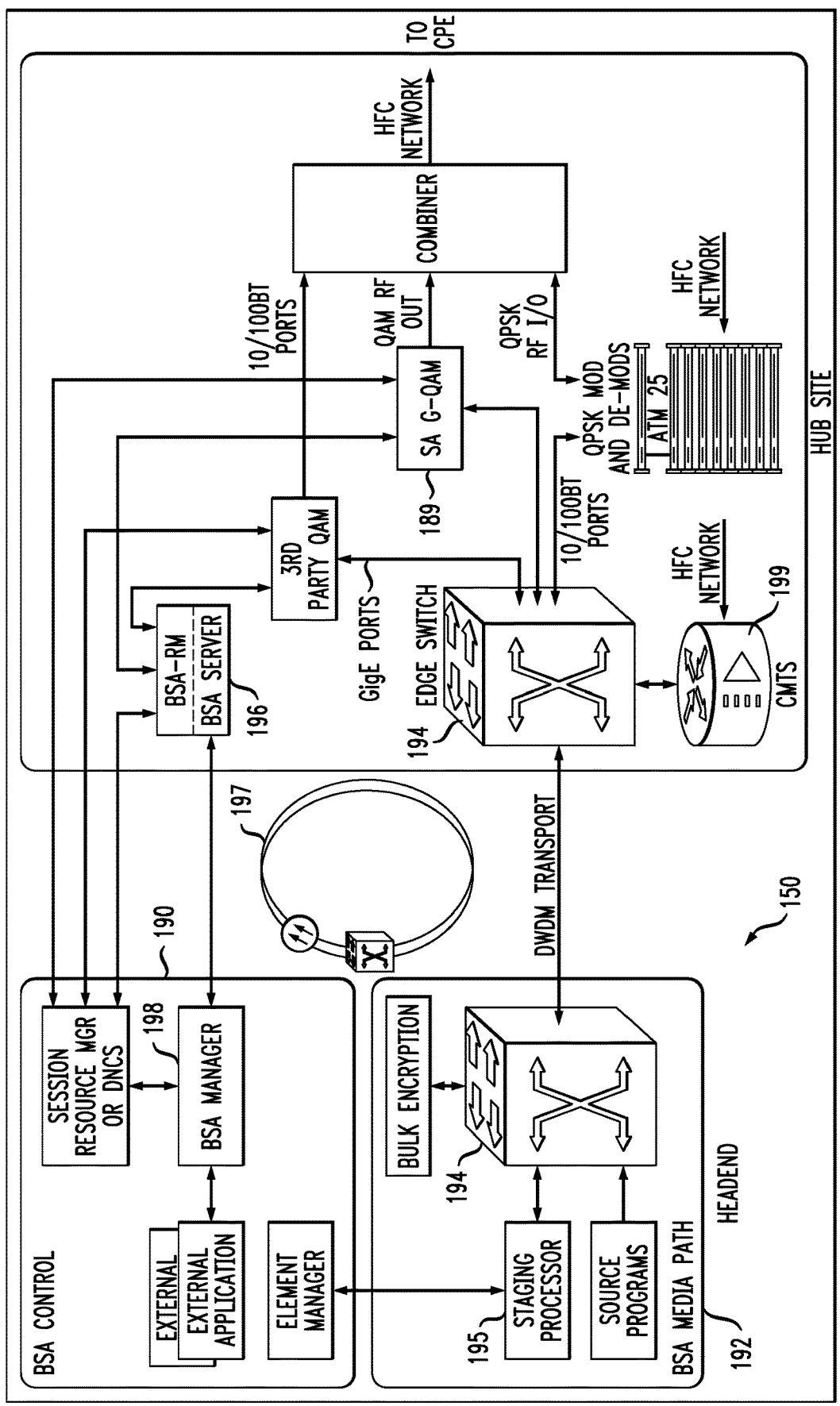
FIG. 1c is a functional block diagram illustrating one exemplary broadcast switched architecture (BSA) network useful with one or more embodiments of the present invention.

FIG. 1*c* illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

With respect to FIG. 1*c*, note that in some current head ends (e.g., those using technology from Motorola, Inc., Schaumburg, Ill., USA) there is no explicit GSRM or digital network control system (DNCS); rather, VOD vendors implement required functionality in their own proprietary way. In other head end configurations, such as in those implemented by Time Warner Cable, Inc, New York, N.Y., USA, GSRM functionality, as described herein, can be employed. Accordingly, it should be understood that the embodiments herein are exemplary and non-limiting, and one or more embodiments of the invention can be implemented with a variety of different devices that are used to carry out appropriate functionality. For example, a session resource manager apparatus to carry out functionality described herein could be implemented in many different ways, and is not limited to the specific GSRM/SRM examples shown in the figures.

In addition to "broadcast" content (e.g., video programming), the systems of FIGS. 1*a*-1*c* may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1*c* can, in the most general case, be the same or different as that shown in the hub site of FIG. 1*c*. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some descriptions presented herein are described in the context of Internet services that include multicast and unicast data, there is potential applicability to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-1C are exemplary in nature and different approaches may be used in other embodiments; such other approaches may have more or less functionality (for example, high speed Internet data services might be omitted in some cases).

Figure 2:
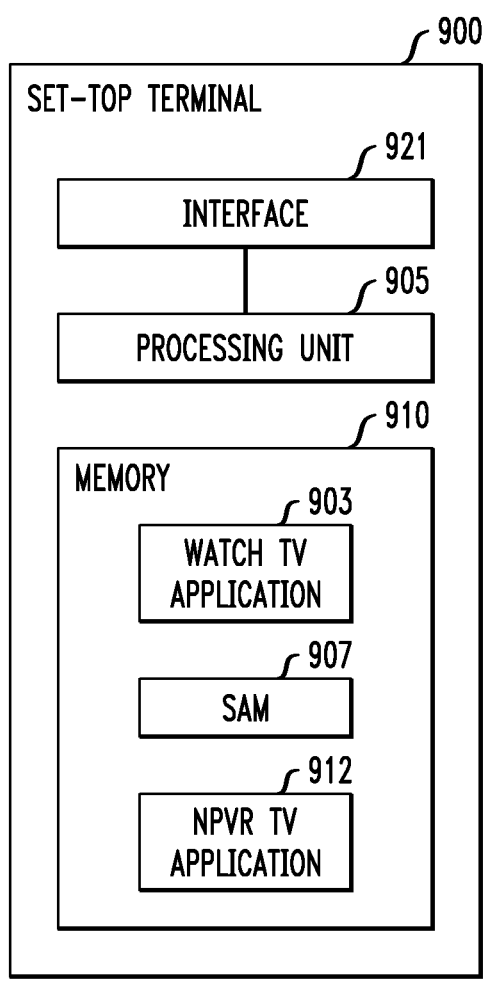
FIG. 2 is a block diagram of a set-top terminal.

FIG. 2 shows an example of a set-top terminal 900, which is one form of CPE 106. A conventional "Watch TV" application (denoted 903 in FIG. 2) is installed in the set-top terminal (denoted 900) to service those program channels (or programs) afforded the traditional broadcast service. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, non-volatile random access memories (NVRAMs), dynamic random access memories (DRAMs), read-only memories (ROMs), and/or Flash ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 900 from head-end 150 after set-top terminal 900 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 900. SAM 907 is responsible for, among other things, monitoring channel change events; administering channel, service and other tables in terminal 900; and maintaining a registry of applications in terminal 900. One such application is the aforementioned Watch TV application 903 which is invoked to service a traditional broadcast channel (or program). Another potential application is a so-called "NPVR TV" application 912 which is invoked to service NPVR (network personal video recorder) enabled channels (or programs), and which may be downloaded from head-end 150 to memory 910. Application 912, among other things, emulates the functionality of a personal video recorder by responding to rewind, pause and fast-forward commands initiated by a user, and communicating such commands to head-end 150 through interface 921 to perform the trick mode (i.e., rewind, pause and fast-forward) functions on programs. In addition, for example, application 912 not only allows a user to reserve future broadcast programs for review, but also reserve, play or restart programming content that has broadcast. Interface 921 allows receipt of in-band and out-of-band material from head end 150, as well as sending communications to the head end via a reverse data channel (for example, of the kind(s) discussed above).

Figure 3:
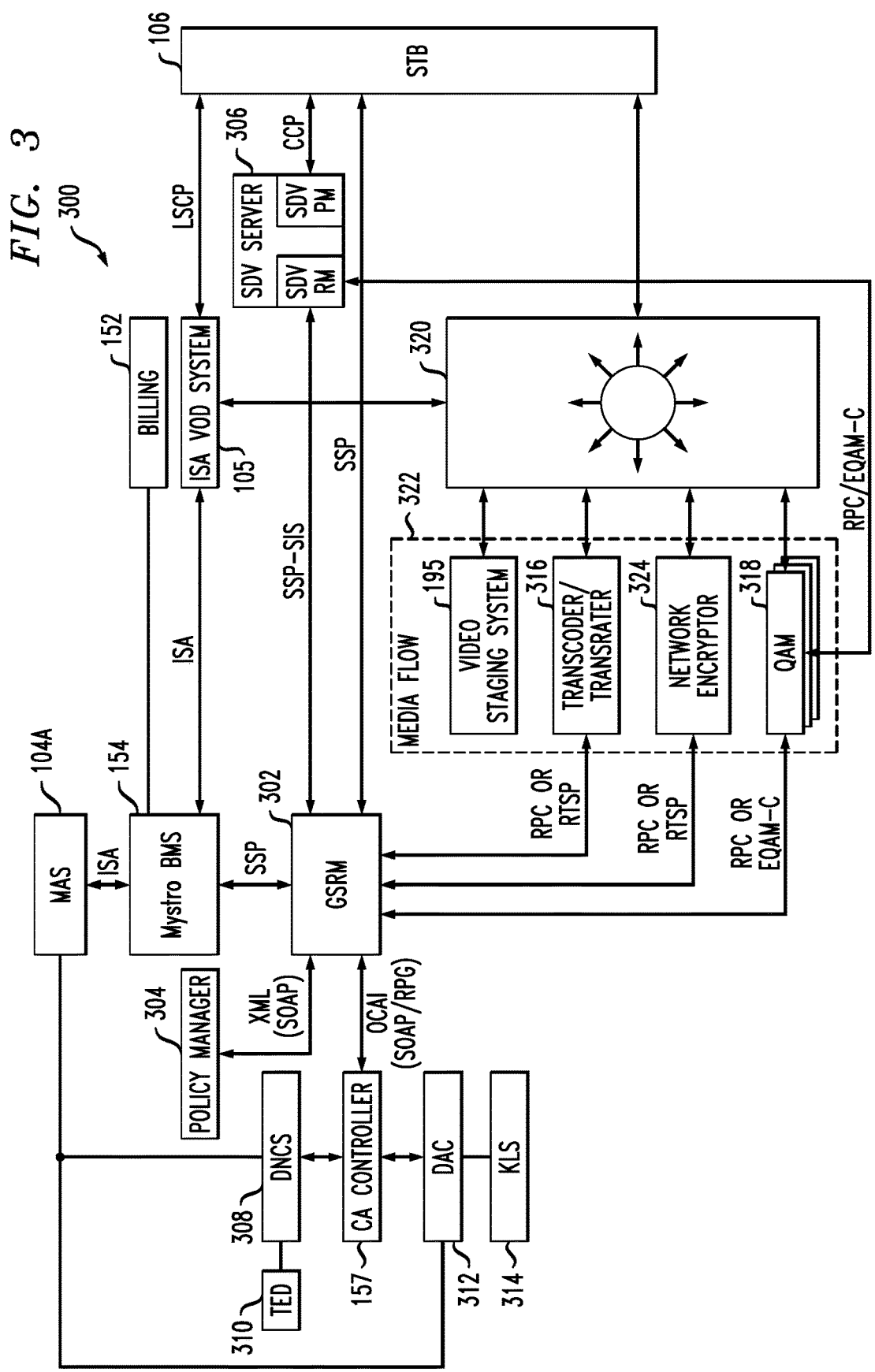
FIG. 3 is a functional block diagram of a video content network with a session resource manager.

One or more embodiments employ session resource management (SRM) functionality to manage video-on-demand and/or switched digital sessions. Preferably, the SRM provides an element that is compatible across a number of head end platforms, such as Motorola, OpenCable, Overlay (SA/Moto) and Scientific-Atlanta (SA). One exemplary embodiment of an SRM is a global session resource manager (GSRM). FIG. 3 shows an exemplary GSRM environment 300, which encompasses an interface to an external policy manager, switched digital video support, and third party entitlement control message generator (ECMG) interfaces. An additional goal is to maintain and reuse currently available interfaces and protocols. Interfaces into an external policy manager may be implemented, for example, via a static XML interface or a dynamic SOAP/XML interface.

GSRM 302 interfaces with conditional access controller 157, which in turn interfaces with digital network control system 308 and TED (transactional encryption device) 310 as well as digital access control system 312 and KLS (key list server) 314. Such interface may employ, for example, open conditional access interface (OCAI) such as SOAP/RPC (remote procedure call). GSRM 302 may also interface with an external policy manager 304, using, for example, extensible markup language (XML(SOAP)) as described in greater detail below. The skilled artisan will appreciate that "SOAP" stands for Simple Object Access Protocol. Also, DNCS 308 may carry out management and CPE configuration analogous to block 308 in FIG. 1a.

Note that a TED is typically present in a system from Cisco Systems, Inc., San Jose, Calif., USA, or a system from Scientific Atlanta (now also part of Cisco Systems, Inc.), and manages the cryptographic keys while the KLS performs analogous functions in systems from Motorola, Inc. of Schaumburg, Ill., USA. These are non-limiting examples of general functionality for managing cryptographic keys. Thus, elements 308, 310 are generally representative of systems from Scientific Atlanta while elements 312, 314 are generally representative of Motorola systems.

Furthermore, the GSRM may interface (for example, using session setup protocol, SSP) with a business management system, such as the Time Warner Cable MYSTRO business management system (BMS) 154. BMS 154 is in turn coupled to billing block 152. The business management system may in turn interface with an application server 104A, such as a Time Warner Cable MYSTRO application server, using, for example, interactive services architecture (ISA). The BMS 154 may also interface with a suitable VOD server 105, such as an ISA VOD system, again, using, for example, ISA.

Yet further, GSRM 302 may interface with a suitable media flow block 322, which may include a video staging system 195, a transcoder and/or transrater 316, a network encryptor 324, and a number of QAMs 318. Communication with block 316 may be, for example, via a suitable transcoder control interface, providing an interface from the GSRM to a transcoder or trans-rater to carry out MPEG manipulation, re-encoding, and the like; communication with block 162 may be, for example, via remote procedure call (RPC) or a suitable network encrypter control interface from GSRM to network encrypter 324; and communication with the QAMs may be, for example, via RPC or edge QAM-C (EQUAM-C). Note that in FIG. 1a, encryption 324 and modulation 318 are combined in block 162. Element 320 is a router.

MAS 104A may be coupled to DNCS 308 or digital access control system 312 as the case may be.

The skilled artisan will appreciate that a messaging interface from the GSRM to a transcoder or trans-rater device, or to a network encrypter, can be implemented, for example, using RPC (remote procedure call) or RTSP (real time streaming protocol) messaging to outline the characteristics of the desired code, rate, or encryption parameters. A transcoder might, for example, convert from MPEG-2 to MPEG-4, in the case where an end client supports MPEG-4. In the case of a trans-rater or statistical multiplexer type of device, the goal is to fit more video programs into a QAM, so the programs are statistically multiplexed together "on-the-fly."

A suitable switched digital video server 306 may also be provided, including SDV RM (switched digital video resource manager to manage resources assigned to the SDV system) and SDV PM (switched digital video policy manager) functionality (not separately numbered). Communication between GSRM 302 and server 306 may be implemented, for example, using session setup protocol server initiated session (SSP-SIS). Server 306 may communicate with QAMs 318 via RPC or EQAM-C. A set top terminal or box (STB) 106 may communicate with VOD server 105 via, for example, lightweight stream control protocol (LSCP); with SDV server 306 via, for example, channel change protocol (CCP); and with GSRM 302 via, for example, session setup protocol (SSP).

Figure 4:
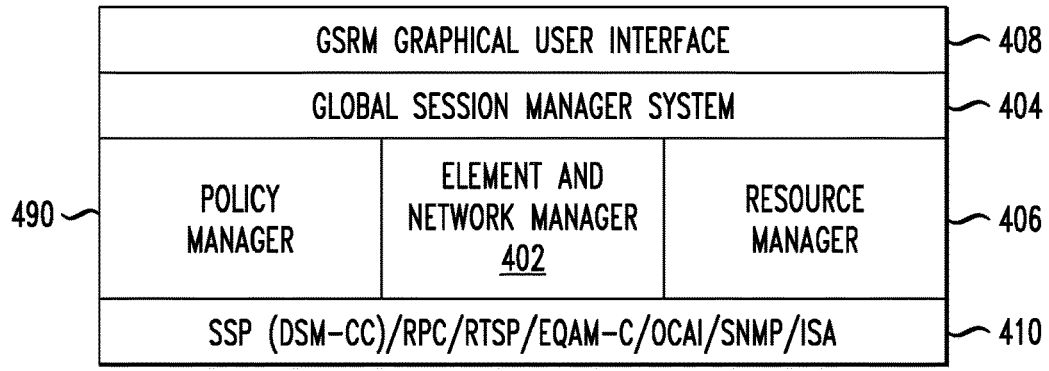
FIG. 4 shows exemplary components of a session resource manager.

As shown in FIG. 4, the SRM 302 encompasses three major functions, namely, element and network manager 402, session manager 404, and policy manager 490. In the first function, the element manager 402 provides provisioning and configuration information for the edge devices (e.g., edge QAMS 318) and network encrypter 324. The second function 404 handles the assignment of network and RF resources for devices generating session requests. Additionally, the SRM 302 needs access, via a secure interface, to the conditional access (CA) system 157 to provide for content security. The third function, policy manager 490, provides the ability to allocate these resources based on pre-determined and real time policies as related to the type of asset and/or program requesting bandwidth from the network, in addition to predetermined techniques that can be used when such policies do not apply. The internal policy manager 490 receives rule-sets via an XML file and/or supports a SOAP/XML interface for real time policy decisions.

In some instances, the SRM functionality resides physically on the VOD server 105, while in other cases it is split between two entities, the VOD server 105 and a session resource manager of the DNCS 308.

The Element and Network Manager component 402 is responsible for a number of functions. Listed below is an overview of the primary components:

A provisioning system for edge devices, video servers, switched digital video servers, network encrypter, network elements, switches, and the like.

Monitoring of various network components to provide SRM engine ability to make session decisions based on available resources.

Managing entitlement messages and conditional access keys, when applicable.

Ability to provide a graphical representation of network components and related interconnects, including setting under/over-provisioning of interconnects.

Ability to provide a graphical interface 408 for designing and managing the network topology and interfaces.

The network manager preferably constantly monitors network usage and reports congestion, failures, downed links, and the like. A significant aspect of the network manager is to provide high (for example, 99.99%) uptime of the network for the delivery of video services. In addition, the network manager is preferably able to proactively provide alternate links (when available) to traffic to minimize service interruptions and stream/session failures.

In a preferred embodiment, to provide the operator with suitable monitoring capabilities, the network manager provides the ability to show the current network utilization of any device and interconnect links. The information is preferably provided in a graphical manner to the operator and highlights any troublesome or failed devices or connections (for example, using the graphical user interface (GUI) 408. A layer representing the various communications protocols is shown at 410.

Figure 5:
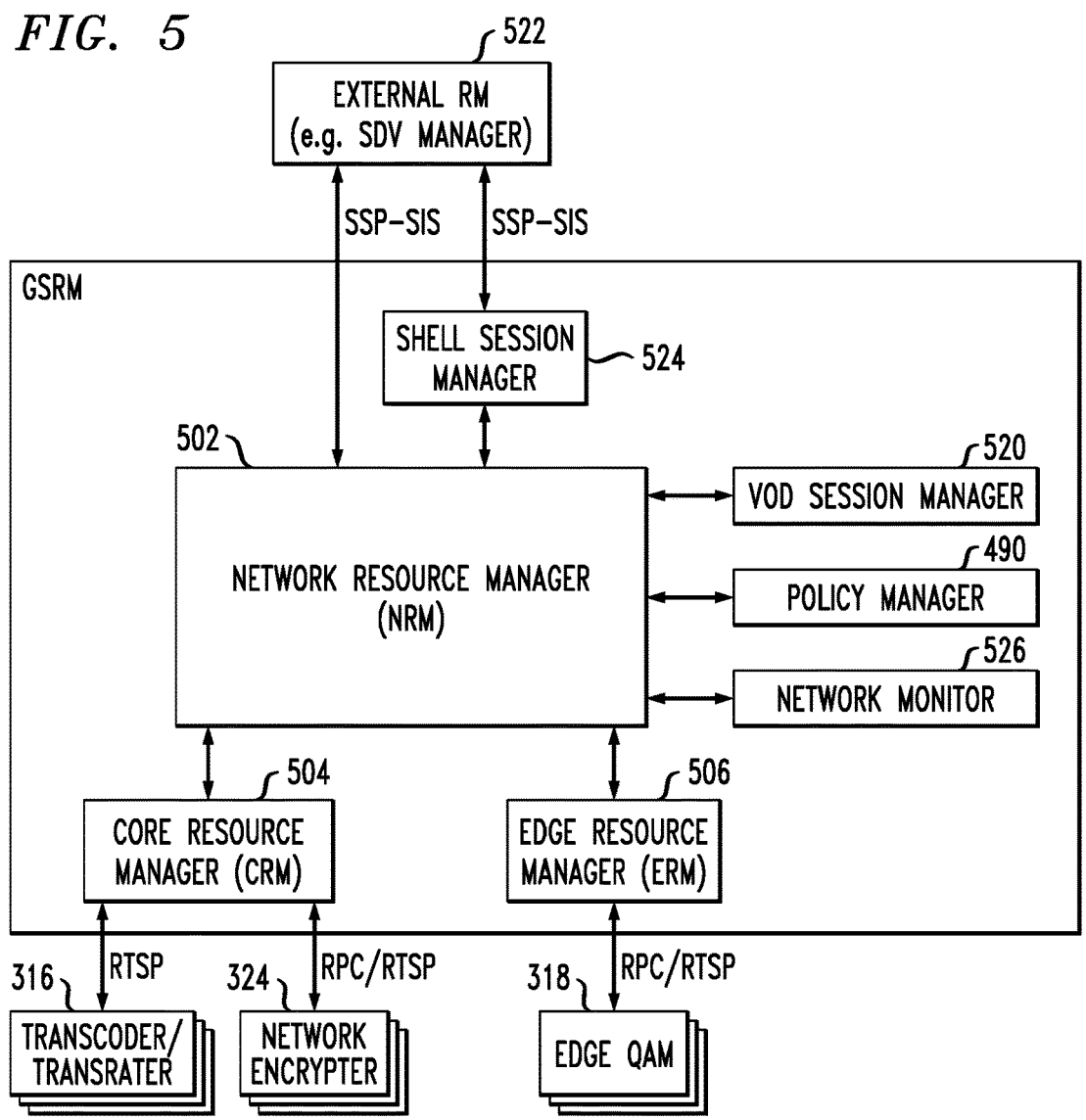
FIG. 5 shows additional details of an exemplary session resource manager in its environment.

As shown in FIG. 5, resource manager 406 preferably includes network resource manager (NRM) 502, core resource manager (CRM) 504, and edge resource manager (ERM) 506. The NRM 502 is responsible for receiving resource requests from the session managers (VOD 520, SDV 522, Shell 524, and so on). After the NRM receives the request, it will then look at what is needed to service the request (encryption, bandwidth, and the like) and then make the requests from the core and edge resource managers 504, 506. The NRM 502 needs to be aware of all of the network (core and edge) resources and their state, so it can make session resource decisions. For instance, if an edge device does not support encryption and the session needs to be encrypted, then the NRM must use the appropriate core encryption device to encrypt the session. Functionally, the NRM, CRM and ERM may be bundled as one process and/or component, or as separate processes and/or components. Note that RTSP stands for real-time streaming protocol. The network monitoring functionality is shown at 526.

With regard to policy manager 490, in one or more embodiments, with business rules manager enabled, session allocation and most network resources can be assigned based on a pre-defined set of business rules. For example, a high-definition (HD) VOD session may be given preference over a free on-demand session. While this is one example, the system is preferably modular, extensible and configurable to allow operators to set the parameters of the business rules engine.

It is also preferred that an operator can determine rules and parameters for the loading of network elements and connections. Instead of purely looking at business rules, new techniques and static configurations may be used for allocating resources on a per-stream and/or per-session or product basis. Some versions of the policy manager (PM) 490 inside the GSRM may allow for XML import of static policy rule sets. Preferably, the GSRM provides a GUI 408 for setting the policies and modifying them. The PM 490 may also support a dynamic policy interface via SOAP/XML to an external policy manager system 304.

A significant function of the session manager (SM) 404 is to provide the mechanism for session requests to receive the proper conduit for the delivery of video. The primary responsibility of the SM is for handling DSM-CC session requests from a VOD client residing on a client device (e.g. STB, and the like). Each time a session is created, the SM must communicate with policy manager 490 and resource manager 406 to determine the best route for the session to be streamed and also determine if, where, and how the session will be set up based on the system policies. Additionally, the GSRM will provide the application server 104 with the appropriate information to determine the type of stream to be created (e.g. MPEG-4 Advanced Video Codec (AVC)) and conditional access method. Non-limiting examples of conditional access methods include the Cisco PowerKEY® conditional access system (registered mark of Cisco Systems, Inc., San Jose, Calif., USA) for a set-top box or the Motorola MediaCipher™ system (mark of Motorola, Inc. of Schaumburg, Ill., USA).

The session manager also works in a split model with SDV manager 522 to receive session requests (pre-provisioned/shell or exclusive/provision) for allocating network resources for this request. It is the responsibility of the GSRM to provide a shell session manager to track and manage shell session requests from an external session manager. The shell session manager should maintain a list of granted shell sessions, even through a reboot, power outage, etc. Additionally, the shell session manager should provide reconciliation tools for the external session manager (e.g. SDV server 306) and query tools for status checking with QAMs.

Figure 6:
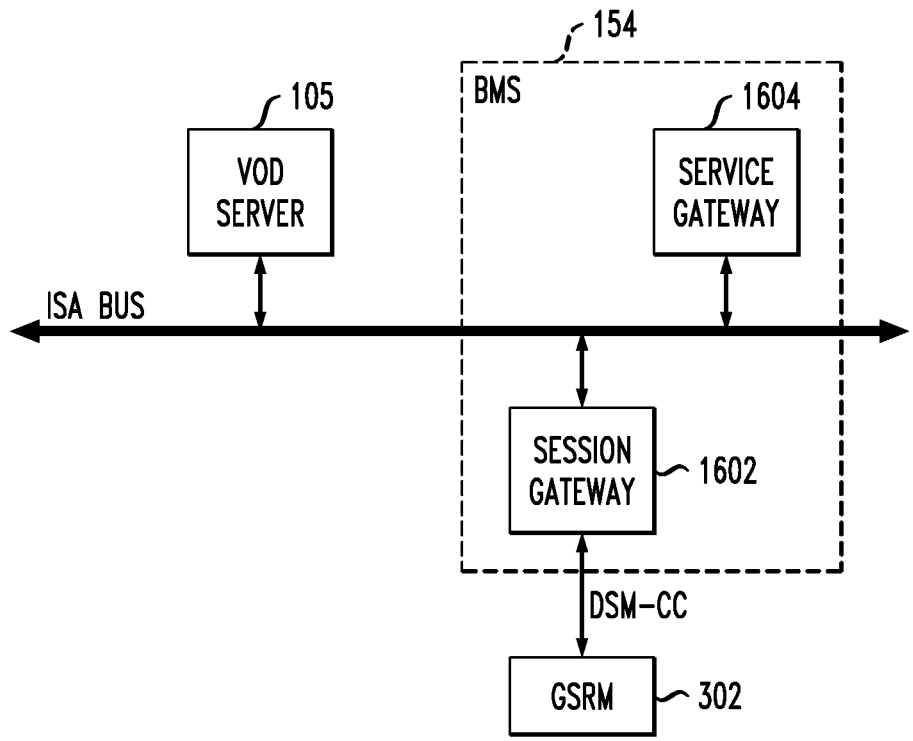
FIG. 6 shows a session manager to session gateway component.

As seen in FIG. 6, in some instances, a session gateway process 1602 resides on the BMS 154 and serves as the entry point for session messaging from DSM-CC to ISA. The GSRM 302 forwards all VOD session communication along to the session gateway and the BMS in turn forwards it to the service gateway 1604. FIG. 6 outlines an exemplary interface structure of the session gateway process residing in the BMS.

Figure 7:
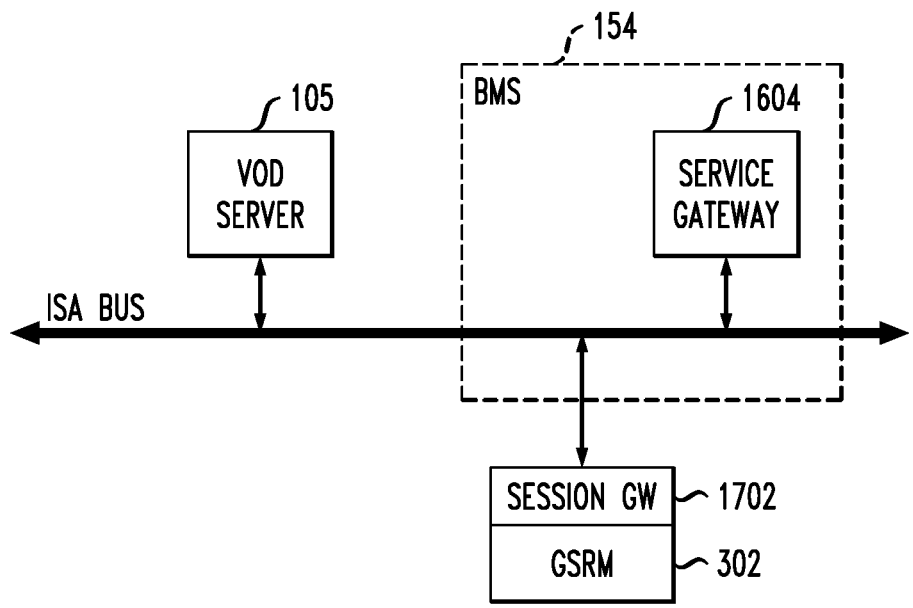
FIG. 7 shows a session manager to service gateway component.

Reference should now be had to FIG. 7. In some instances, the GSRM and ISA VOD infrastructure may gain certain efficiencies in session setup speed and reliability by moving the session gateway process 1602 onto the GSRM, as shown at 1702 in FIG. 7. The GSRM would then communicate directly to the service gateway 1604 on the ISA bus. Inasmuch as part of the client session request is a descriptor for the service gateway, the GSRM would use this descriptor to pass the appropriate session request information to the referenced service gateway.

The ISA bus is primarily directed towards using Common Object Request Broker Architecture (CORBA) for messaging the ISA interfaces. Direct communication of the GSRM to the service gateway would require the GSRM to implement the appropriate ISA and CORBA interfaces. Other alternatives to the CORBA interface include SOAP/XML.

It is preferred that a variety of different interfaces be supported by GSRM and the related components and processes, so as to permit interface with hardware and software from many manufacturers, such as Motorola, Scientific-Atlanta and Overlay (Moto/SA) systems. The aforementioned SSP reflects an implementation of the ISO/IEC 13818 MPEG-2 DSMCC specification.

The SRM 302 manages a pool of HFC and network resources across many edge devices (e.g., edge QAMS 318) and reaching multiple service groups. Note that core devices may include, for example, network encrypters, transcoders, statistical multiplexers, and the like. For the setup of a particular session, the SRM allocates resources from the aforementioned pool. The qualified resources are determined by the service group specified by the STB 106. A mechanism that indicates that an edge device has been removed from service, and thereby its resources must be removed from the allocation pool, is provided in one or more embodiments. The element manager 402 configures the edge device with static configuration information such as modulation mode, transport ID (frequency), as well as provisioning the MPEG-2 multi-program transport stream. This information must be communicated to the SRM so that is can be transmitted to the STB along with session specific information during session set-up.

Service applications and clients communicate to the SRM using the session setup protocol, an implementation of DSM-CC. Certain parameters such as retransmission rate for the messages are not defined within the specification. These must be defined or left as configurable parameters for the SRM. In some instances, these messages are actually passed through the session gateway to provide a distributed object interface for the sessions.

In SSP, the client 106 sends a client session request to the GSRM 302 to begin the session establishment. This request contains information for identifying the service group as well as information pertinent to the server application. The GSRM verifies the message integrity and passes it along to the server with which the session is desired (e.g., VOD server 105, BMS 152, 154, application server 104). The server makes a server add resource request to the SRM, including the amount of downstream bandwidth, MPEG Program and server conditional access. Also included is the Ethernet descriptor if the application desires to indicate a preference. In another aspect, the "server add resource" request may include only a source parameter, allowing the GSRM 302 to respond with the appropriate resources.

The SM will determine resource availability after consulting with the resource manager 406 and policy manager 490. If the resources are available, the GSRM 302 will allocate the appropriate resources and signal an indication of success back to the server. If the system requires encryption, the GSRM 404 will send a suitable request for same to the DNCS CA Manager (CAM) 157. If the requested resources are available, the CAM will reply with a confirmation. The GSRM 302 then will send the appropriate CA credentials to the client and encryption device.

At this point, the server provides a response in which the IP address of the service entry point is specified. In case of failure, the GSRM adds the resources back to the pool. The GSRM uses the HFC resources allocated from the pool to construct a confirmation including modulation mode, transport ID, bandwidth, client conditional access and service entry IP address. The SRM handles a client release request message to allow the client to abort in progress session setups. Once the session has been created, the application server 104 and/or VOD System 105 will create the appropriate stream for the client.

The GSRM's role as the "global" resource manager places it in the position to manage, monitor and control the network (incl. HFC) resources for sessions. To provide a robust QAM sharing ability, the GSRM must be the central arbiter between VOD and SDV sessions. SDV Server 306 will reside external to the GSRM server and will utilize the SSP-SIS extensions to request session bandwidth. The SDV server may request this bandwidth using one of a few methods:

Shell session (pre-provision)
Exclusive session (shell or RM provisioned)
Combination of shell and exclusive The GSRM is preferably agile enough to handle all these modes simultaneously from an external SDV system 306.

Since Network Resources become more valuable and scarce with each session request from clients and servers, the GSRM preferably provides a method for arbitrating these requests. The GSRM sets session thresholds based on product type for VOD (e.g., free on demand (FOD), movies on demand (MOD), subscription video on demand (SVOD), etc.) and switched digital video (SDV). The MSO can define the name of the product and amount of allowable sessions per service group. In addition, the system provides a way to proactively request session resources back from a client and/or SDV manager. A ceiling can be prescribed by product and/or service and when the ceiling is exceeded requests and/or teardowns could be done on the least preferable sessions (for instance, FOD). The described functionality provides a level of policy control on the sessions being allocated by the GSRM. The GSRM preferably provides the ability to easily support an external policy manager 304 via a SOAP/XML interface that provides extended capabilities.

The Session Resource Manager functionality may reside on a single component such as a VOD server or may be spread across multiple components. In one or more embodiments, the Session Resource Manager (SRM) is the central mechanism for aligning head end resources to establish a peer-to-peer connection between the video server and the end user's set-top box (STB). A sub-component of the SRM is the actual bandwidth allocation technique. With the addition of High Definition Video-On-Demand to the current offering of Standard Definition Video-On-Demand, appropriate techniques should be employed to support the commingling of High Definition Video-On-Demand (HDVOD) and Standard Definition Video-On-Demand (SDVOD) content and the establishment of Quality of Service (QoS) guarantees between the two different services.

The narrowcast bandwidth of the VOD service group is arguably the most expensive bandwidth within the cable system. Video server streams, transport, switching fabric, QAMs, RF-combining and distribution all contribute to this cost, which is distributed over a relatively small subset of subscribers. Additionally, this narrowcast bandwidth is re-created over and over again to provide service to all subscribers. One or more embodiments optimize the utilization of this expensive bandwidth. Regardless of the infrastructure or of the protocol or which component is actually performing the allocation (Business Management System (BMS) 154; Digital Network Control System (DNCS) 308 or VOD Server 105) it is preferred, for operational predictability, that any or all of the components optimize and allocate the bandwidth in the same manner.

When performing traffic model analysis, significant variables that contribute to the performance of the system are the probability of the arrival of the session setup request and the probability of the session hold-time. These variables contribute to the loading factor with respect to a blocking factor, which ultimately determines the number of resources required to serve a given population of users.

Historically, when working with a single encode rate the system-blocking factor was based on the VOD Service Group. With the commingling of different encode rates, a new blocking factor is introduced into the system. This is the QAM blocking factor, and it is based on the probability of having enough bandwidth to support an HD session within a given QAM. While there may be enough bandwidth within the VOD Service Group to support an HD session, if it is not all available on a single QAM channel, the HD session is blocked and the bandwidth is considered "stranded" with regard to its ability to support an HD session. This occurs when the bandwidth consumption on a given QAM exceeds the max rate of the QAM minus the HD rate or, for example, 37.5 Mbps–15 Mbps equaling 22.5 Mbps.

Additionally, the probability of whether the next session request to arrive is either a SD or HD session factors into the allocation technique. This probability is based on multiple factors including HD STB penetration rates, buy rates, demographics and content availability. The hold-time of a session will also be impacted based on the length of HD content offered.

The allocation models presented herein represent a view of the allocation of sessions by ignoring the hold-time of sessions. Presenting this material without representing the departure of session does not invalidate the allocation technique as session hold-time, and thus session departure, has been factored into the allocation models. The reason that it does not invalidate the allocation technique is that each allocation decision is made at the time of session setup with the most current snapshot of bandwidth allocations across all QAMs within the service group.

While the examples are centered around SD content encoded at 3.75 Mbps and HD content at 15 Mbps the allocation technique can easily support multiple SD and multiple HD encode rates by tuning the various parameters. Additionally, service groups with greater than four RF channels are easily supported without any changes.

Assumptions for the Examples Include:
1. Each VOD Service Group includes four 6 MHz RF channels running QAM256.
2. The Standard Definition (SD) rate is 3.75 Mbps. The High Definition (HD) rate is 15 Mbps or four times the SD rate. Thus, the bandwidth requirement for HD is four times that of SD.
3. Every QAM256 channel has the capacity or payload to transport 37.5 Mbps of MPEG-2 video out of a total capacity of 38.8 Mbps. The additional QAM bandwidth is reserved for overhead for encryption, sessions, etc.
4. Although the specification uses sessions as a simplified unit of measure for bandwidth, all decisions are really based on bandwidth and not the number of sessions of a particular rate.
5. The bandwidth utilization and allocation within a QAM does not experience fragmentation as occurs within RAM memory stacks. Thus, there is not the problem of seeking a "largest free block" as all the remainder bandwidth is available for allocation.

Several new variables are introduced in order to provide control of how bandwidth is allocated per service group. They are the VType(2)_Session_Limit and the VType(1)_Session_Limit. Control and flexibility can be attained when these two variables are used in conjunction with an optimized allocation technique.

VType(n)Threshold : The variable represents the upper bandwidth threshold to switch between the least loaded model to the most loaded model.
VType(n)_Session_Limit : The variable represents the maximum number of simultaneous VType sessions within a VOD Service Group.
VType(n)_Rate : The rate of the VType CODEC.
VType(n)_Session_Count : The variable refers to the number of current VType Sessions.
VType(n) : Defines the CODEC type as one of the following HD-MPEG-2 @ 15 Mbps, SD-MPEG-2 @ 3.75 Mbps, HD-H.264 @ 7.5 Mbps, SD-H.264 @ 1.875 Mbps (the H.264 rates are only listed as an example)
VType(1) : HD-MPEG-2 @ 15 Mbps
VType(2) : SD-MPEG-2 @ 3.75 Mbps
VType(3) : HD-H.264 @ 7.5 Mbps
VType(4) : SD-H.264 @ 1.875 Mbps
..
..
..
Vtype(n) : CODEC @ Mbps Configuring the system with hard limits and not oversubscribing the system will reserve bandwidth and guarantee service for each individual service. Configuring the system in an oversubscription model (defining the sum of both variables to a value greater than the total capacity) allows for a floating pool of resources that will be allocated as requests arrive. Oversubscription has the advantage that the bandwidth is not stranded through the reservation process, if there are no requests for that service, while at the same time providing QoS guarantees. The following examples illustrate this.

Example 1: VType(2)_Session_Limit=32 and VType(1)_Session_Limit=2: The hard limits reserve the bandwidth and guarantee service for both SDVOD and HDVOD—in this case 32 SD sessions and 2 HD sessions. Even if there are no HD sessions and the 33rd SD session request arrives, it will be denied.

Example 2: VType(2)_Session_Limit=40 and VType(1)_Session_Limit=8: In this totally over-subscribed example setting the variables to their theoretical maximum values allows the system to operate freely without any controls, first come first served.

Example 3: VType(2)_Session_Limit=40 and VType(1)_Session_Limit=2: This example allows the possibility of no more than two HD sessions, but does not guarantee them while allowing up to 40 SD sessions.

Example 4: VType(2)_Session_Limit=32 and VType(1)_Session_Limit=8: This example allows the possibility of 32 SD sessions and reserves bandwidth for two HD sessions while supporting the possibility of eight HD sessions.

The allocation technique is preferably optimized to:
Support configurability for a "Least Loaded" and a "Most Loaded" session allocation model
Compromise between load balancing across QAMs and HD session support
Enable lowest impact on active session in the event of failures
Increase the probability of having capacity for an HD session
Establish a mechanism to manage a QoS of SD and HD sessions within a VOD Service Group
Implement business rules guaranteeing service levels for both SD and HD sessions
Support multiple SD and multiple HD encode rates
Support varying number of channels per service group
Allow dynamic tuning of network utilization To maintain parity among implementations of the technique, the following variables types are employed.

An initial technique only accounts for MPEG-2 CODEC streams, it being understood that other CODEC and bit-rates can be defined in other versions. In some instances, the VType(1)_Threshold may be set to max bandwidth in a QAM minus the HD encode rate (e.g. 37.5−15=22.5). Once the bandwidth utilization within a QAM for a VOD Service Group reaches this threshold, the allocation technique will start stacking sessions on the least loaded QAM over the VType(1)_Threshold value.

By manipulating the VType(1) Threshold value, the system's performance can be tuned based on the contention found in the system. By setting the VType(1)_Threshold to 37.5 Mbps (the max QAM bandwidth), the technique will allocate in a "least loaded" technique.

Since HD sessions require four times the amount of bandwidth when compared to SD sessions, there needs to be a way of limiting the number of HD sessions so that they cannot use all the bandwidth within a service group, which can result in denial of service. Limiting the number of HD sessions allows for the theoretical reservation of enough bandwidth to support SD VOD sessions. Conversely, limiting the number of SD allows for the theoretical reservation of enough bandwidth to support HD VOD sessions.

Reference should now be had to FIG. 8. Once the VType(1)_Threshold is reached across any QAM within a service group, the technique should start stacking sessions on the QAM channel that has passed VType(1)_Threshold. This method of allocating sessions will increase the probability of having the capacity to support an HD stream. This will allow a mix of 36 SD sessions and one HD session as shown in the figure.

In essence, the session requests that are provisioned below the VType(1)_Threshold are allocated across the QAMs within a VOD Service Group in a "least loaded" model and session requests that are allocated above the VType(1)_Threshold are allocated in a "most loaded" model. The following are exemplary steps to allocate bandwidth:

1. Determine if the session setup request is either a VType(1)_Rate or VType(2)_Rate 2. Compare the VType(2)_Session Limit or the VType (1)_Session_Limit to the new request type and then deny the session setup request if it equals the session limit type (QoS test) else
3. Check the bandwidth utilization across all the QAMs within a VOD Service Group and determine the lowest bandwidth utilization
4. If the lowest bandwidth utilization is below the HD_Threshold value on any QAM, then allocate the bandwidth on the least loaded QAM that has the requested capacity available (if the first QAM does not have the capacity try the next- QAM1→QAM2→QAM3→QAM4→ ...... QAM #n) else
5. Allocate the bandwidth on the most loaded QAM above the VType(1)_Threshold value QAM that has the requested capacity available (if the first QAM does not have the capacity try the next QAM— QAM1→QAM2→QAM3→QAM4→ ...... QAM #n)

By allocating sessions in the manner described above, the session allocation would, in one non-limiting example, appear as in FIG. 9. In this example:

Session 1 through 24 are below the VType(1)_Threshold and are allocated in a "least loaded" model 25th SD session request is above the VType(1)_Threshold and is allocated on the first most loaded QAM channel. In this example, it would be on QAM1.

26th HD session request is above the VType(1)_Threshold and is allocated on the first QAM with enough available bandwidth to support the HD session. In this example, it would be on QAM2.

27th and 28th SD session requests are above the VType(1)_Threshold and are allocated on the first most loaded QAM channel. In this example, it would be on QAM1.

29th HD session request is above the VType(1)_Threshold and is allocated on the first QAM with enough available bandwidth to support the HD session. In this example, it would be on QAM3.

30th SD session request is above the VType(1)_Threshold and is allocated on the first most loaded QAM channel. In this example, it would be on QAM1.

31st, 32nd, 33rd and 34th SD session requests are above the VType(1)_Threshold and are allocated on the first most loaded QAM channel. In this example, it would be on QAM4.

Aspects of the invention may be applicable, for example, to Video on Demand (VOD), Switched Digital Video (SDV), Video-over-IP, IPTV, Video to Mobile devices, and the like. One or more embodiments provide a method for more efficiently using bandwidth based on the demand and revenue generated for particular broadcast or On Demand content. Currently, all bandwidth is valued at the same rate, but setting thresholds allows assuming an actual cost per bit for bandwidth.

By way of recapitulation, since network resources become more valuable and scarce with each session request from clients and servers, the GSRM should provide a method for arbitrating these requests. The GSRM should be able to set session thresholds based on product type for VOD (e.g. FOD, MOD, SVOD, and the like) and SDV. The user (MSO) should be able to define the name of the product and amount of allowable sessions per service group. In addition, the system should provide a way to proactively request session resources back from a client and/or SDV manager. A ceiling can be prescribed by product and/or service and when the ceiling is exceeded, requests and/or teardowns can be done on the least preferable sessions (for instance, Free on Demand). The functionality described herein will provide a level of policy control on the sessions being allocated by the GSRM. The GSRM should provide the ability to easily support an external policy manager via a SOAP/XML interface that provides such extended capabilities.

The SRM and digital network require a component to manage how sessions are allocated and controlled based on business policies and dynamic techniques. For example, services could be limited in a service group for a set amount of session resources based on product and service types:
Example
Service Group: Aggregate 155.2 Mbps of bandwidth per SG
AoD (Adult on Demand): no threshold/cap
SDV: 38.8 Mbps cap
FoD (Free on Demand): 15 Mbps cap
HDoD (HD on Demand): 116.4 Mbps cap
MoD (Movies on Demand): 116.4 Mbps cap In addition, the policy management functionality can exist in the GSRM/SRM or can be a separate system. If a separate system, the policy management rules can be published to the GSRM/SRM to allow the RM to arbitrate. Alternately, the policy manager system could be consulted on each session request to provide the needed policy on the stream.

In one or more embodiments, the policy, session limitations, or thresholds are set on a service group by product and service types. Since limited bandwidth is available in each service group, one or more embodiments limit session establishment, based on service type. For example, if it is desired to limit how many free on-demand sessions are offered in a service group, so as to make more room for services for which the MSO can charge revenue, it is possible to set thresholds at the SRM to limit the number of sessions of a given type. Accordingly, if 40 sessions can theoretically be supported, due to limited bandwidth within a service group, an appropriate limit might be four sessions for free on-demand. The above-described SRM manages sessions and network resources such as edge QAMS, network encrypters, and the like, and may be located, for example, in the head end in communication with the BMS and VOD systems. It can be implemented as a software program running on a computer or computers such as a server or servers (for example, VOD server 105). The SRM can advantageously be programmed to implement management by service as described herein, optionally using an external policy manager 304.

The specific SRM and/or GSRM described above of course represents only one non-limiting exemplary implementation. Other implementations may differ; for example, they may omit some components or functions, add other components or functions, may treat some things as mandatory which have been described as optional or vice versa, and so on. In essence, somewhere in the head end (or possibly an intermediate node), there is a server with a suitable program (for session and resource management) that monitors usage, and such program limits the number of sessions for a particular product or service type for video-on-demand services. It may also arbitrate between switched digital video or switched digital video overflow sessions. Thus, if the switched digital video system needs additional resources (e.g., edge QAM resources for a particular service group), it can request same from the program, which can then provide the resources if they are available.

SVOD may receive a higher priority as compared to FOD, for example. However, even SVOD may be offered as a free service to subscribers so there is no incremental charge to view the content.

The thresholds can be configured on the GSRM or via an external policy manager or system that could publish business or policy rules into the GSRM. Then the GSRM takes the rules and applies them to each session request that comes in. The STB requests a session using an upstream data channel. The GSRM is cognizant of that and decides whether to grant the request based on policy rules.

The GSRM obtains the rules and each session request is validated against the rules. Depending on whether there are available session resources, the GSRM will grant or deny the request for the session.

In another aspect, dynamic pricing of assets can be employed so that as bandwidth becomes more scarce, the pricing can be dynamically changed. As resources become more expensive, indications can be sent to the client (or wherever the metadata of the pricing is held) that a given service has now become more expensive.

An exemplary set of rules for operation of the GSRM and/or policy manager to control session allocation will now be provided.

Rule 1: The Policy Manager has an XML interface for business and policy rules to be added to the system; for example, to allow sessions to be prioritized based on revenue models. This is desirable so that one can compile rules in XML and import them; in some instances, external policy manager 304 is employed so that an operator may use same to set rules and then export them out to the GSRM. That is, the policy manager could just be internal to the GSRM, as per policy manager element 490 within the GSRM per se, or could be two devices, an external policy manager 304 that communicates with the policy manager process 490 on the GSRM.

Rule 2: The Policy Manager supports the ability to add, import and modify techniques and/or rules to the system. For example, the HD-SD stacking technique discussed above can preferably be added and/or updated as necessary.

Rule 3: The Policy Manager allows the operator to set prioritization and thresholds on products that utilize the GSRM.

Rule 4: The Policy Manager provides the ability to service products and services (various VOD Products, SDV requests, etc.) by service group.

Rule 5: The Policy Manager provides an XML interface to import business and policy rules in a standard XML format.

Rule 6: The Policy Manager preferably is able to tear down sessions when bandwidth is needed for other streams, as dictated by programmable business rules.

Rule 7: The Policy Manager supports the ability to tune the technique and business rules. That is, changes can be made to the techniques as they are approved, modified or updated. Preferably, re-coding is not required to change policies; rather, policies can be dynamically changed as necessary by providing parameters in a data file or the like. Such parameters specify whether a given session is allowed based on certain criteria. See discussion of FIGS. 12A-12C below.

Rule 8: The Policy Manager implements the HD-SD Session Stacking technique discussed above. Additional techniques may also be used in addition or in lieu of same.

Rule 9: The Policy Manager preferably allows for rules to be run through a simulator (which may, for example, be vendor-supplied) to test for validity before implementing. In addition, the ability is preferably provided to allow for techniques to be tested before being enabled. With this type of testing, the GSRM can test new techniques and business models against real, live session requests before enabling the new technique into the live system. That is, a simulation can be run or rules validated, once they are implemented, so they can be verified. Otherwise, for example, a policy that is not implemented properly might block every session; or a policy might cancel itself and revert to first-come, first-serve. Accordingly, it is preferred to be able to validate and/or check logic imported into the system, to make sure that it meets the criteria. In essence, the rules are placed in the system but are not used to police, but rather to measure what they would have done and to evaluate whether that is appropriate.

Figure 10:
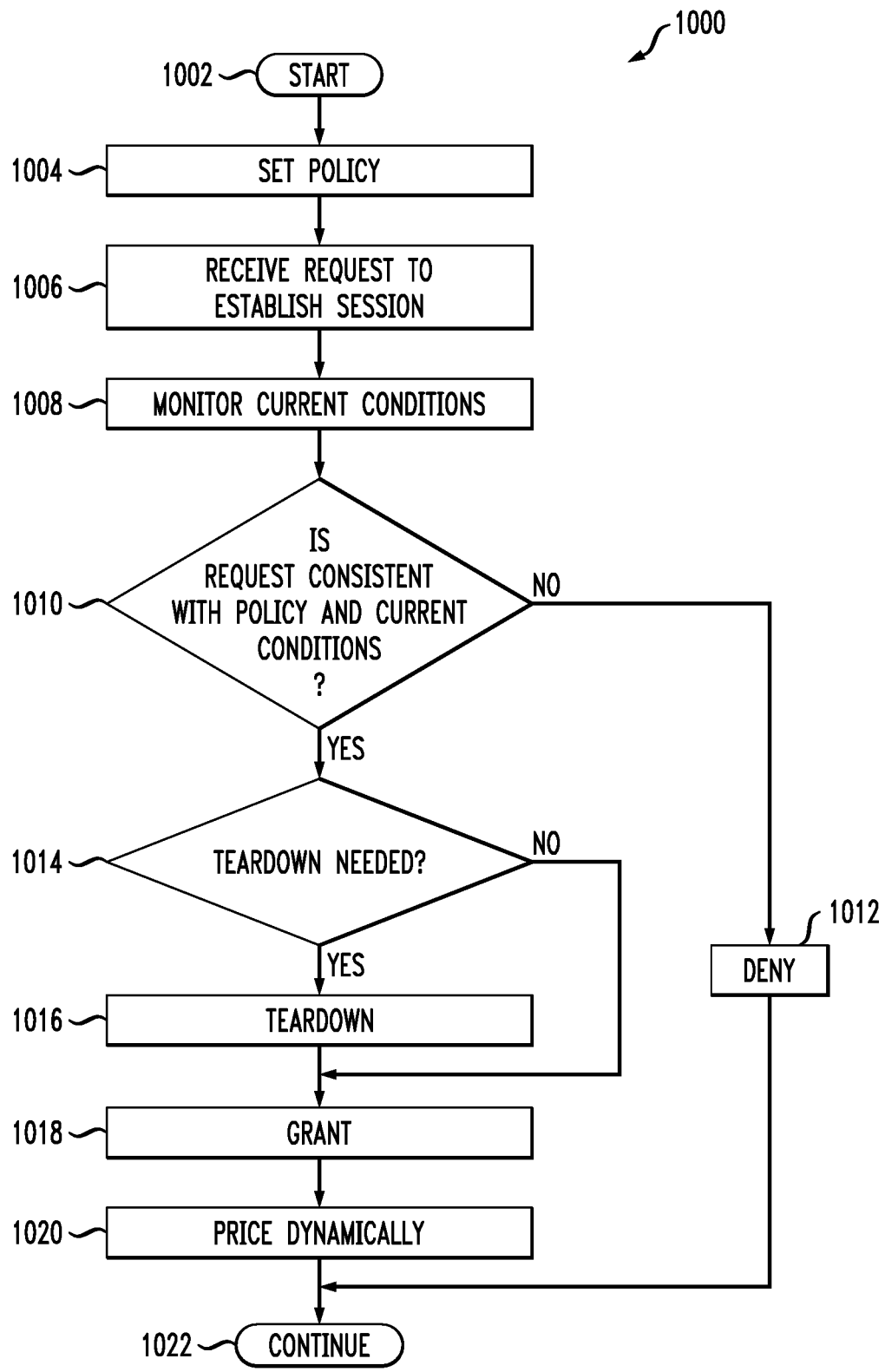
FIG. 10 is a flow chart of exemplary method steps.

FIG. 10 shows a flow chart 1000 of exemplary method steps. Processing begins in step 1002. Given the discussion thus far, it will be appreciated that, in general terms, an exemplary method, according to an aspect of the invention, includes the step 1006 of receiving, from one of a plurality of terminals in a service group of a video content network, a request to establish a session with a head end of the network. The video content network provides at least first and second different categories of sessions to the service group. The request from the terminal might be received, for example, by a GSRM 302 over a reverse data channel. Block 1008 and decision block 1010 include evaluating the request against a policy. The policy specifies a maximum utilization threshold for sessions of the first category and for sessions of the second category (and for any other categories). Step 1018 includes granting the request if it is conformance with the policy.

In the event that the request is not in conformance with the policy, the request may be denied as shown at 1012, and processing may proceed to continue block 1022 (awaiting the next request).

The evaluating step can include monitoring current conditions (e.g., number of sessions currently in progress between the head end and the service group, and what category of session each current session falls into; or how much bandwidth is currently in use by sessions of each category), as at 1008. The decision in block 1010 can then be made based on whether adding the requested session will violate the policy. This is to be distinguished from first come-first served techniques, or techniques which merely check if there is sufficient bandwidth, without considering what category the newly requested session falls into or what categories of session are currently in progress.

Thus, in some cases, the maximum utilization threshold for the sessions of the first category is specified as a maximum allowable number of the sessions of the first category, and the maximum utilization threshold for the sessions of the second category is specified as a maximum allowable number of the sessions of the second category. In an alternative approach, the maximum utilization threshold for the sessions of the first category is specified as a maximum allowable bandwidth allocated to the sessions of the first category, and the maximum utilization threshold for the sessions of the second category is specified as a maximum allowable bandwidth allocated to the sessions of the second category.

One or more categories of sessions may be afforded a higher priority than one or more other categories of sessions, according to the policy. This may be implemented, for example, by allowing a higher utilization threshold for the favored category(ies).

The different categories of sessions can include, for example, a number of different kinds of services; for example video on demand, switched digital video (typically a linear broadcast option), gaming, and file download. Different embodiments could have any or all of these, some or all of these with other categories, or only other categories. In at least some cases, there may be different types of products within the different types of services. For example, within the video on demand service there might be products such as movies on demand, high definition on demand, free on demand, and subscription on demand. Within the switched digital video service, there might be sports, standard definition switched digital video (e.g., MPEG-2), music (e.g., live concerts), and high definition switched digital video (e.g., MPEG-4). Within the file download service, there might be high definition movie downloads, standard definition movie downloads, and subscription movie downloads. Within the gaming service, there might premium gaming and standard gaming. Again, different embodiments could have any or all of these, some or all of these with other products, or only other products.

As discussed above, granting of the request can include the GSRM 302 allocating resources of the video content network to establish the requested session.

As shown at optional step 1020, in some instances, an additional step includes dynamically pricing the at least two different categories of sessions, based upon a current traffic level. A human viewer associated with the session request can then be advised, preferably in real time, of the dynamic pricing. For example, the price may rise if there is more traffic, because less bandwidth is available to accommodate the given need. By way of illustration, suppose only enough bandwidth is left for the given service group to accommodate one last movie—the price for the movie may be adjusted accordingly to reflect the limited available bandwidth. A real time message may appear on the subscriber's television screen, indicating that the network is congested, and the requested session will have an additional associated cost. Such a message can be generated, for example, by GSRM 302 and sent back to the subscriber's menu to advise the subscriber that the price is dynamically adjusted due to current network congestion.

Any or all of the steps can be carried out by SRM 302. In a preferred approach, an additional step 1004 includes setting the policy; for example, by updating a data file in communication with the SRM (e.g., in the external policy manager 304).

In some instances, after determining that the request is appropriate in decision block 1010, a determination is made as per block 1014 whether it is necessary to tear down at least one of the existing sessions in order to grant the request. If such is the case, tear down is carried out in step 1016; otherwise, processing can flow directly to step 1018.

As noted, it may be desirable to repetitively carry out the receiving and evaluating steps 1006-1010, without the granting or denying steps 1018, 1012, for a predetermined time, prior to implementing the policy. That is, the policy is evaluated before deployment, without actually granting or denying sessions based on it, to determine correct functioning.

In another aspect, a session resource manager apparatus (e.g., GSRM 302) is configured for coupling to a video content network as described herein. The session resource manager apparatus can include, for example, a memory 1130 and at least one processor 1120 coupled to the memory, and operative to carry out any one or more, or all, of the method steps described herein, or to facilitate such carrying them out (elements 1120 and 1130 are discussed in detail below). The apparatus can further include a policy store accessible to the at least one processor (e.g., external policy manager 304 and/or internal policy manager 490).

In still another aspect, an exemplary system includes a video content network as described herein, a head end (such as 150) coupled to the video content network, a service group (such as 182) coupled to the video content network and having a plurality of terminals 106; and a session resource manager apparatus as just described. The session resource manager apparatus is preferably located in the head end.

FIGS. 12A-12C present an example of a file that can be used to define a policy. In FIG. 12A, a QAM service policy is defined. The categories include video-on-demand (VOD), switched digital video (SDV), and different services ($x^{th}$ service is $SRV_x$). In FIG. 12B, allowable thresholds are defined in terms of the allowable bandwidth, in megabits per second (Mbps). In all service groups, free on demand (FOD) sessions are limited to 15 Mbps, subscription video on demand (SVOD) sessions are limited to 37.5 Mbps, and high definition on demand (HDOD) sessions are limited to 15 Mbps. In service groups 2, 3, and 5, movies on demand (MOD) sessions are limited to 22.5 Mbps, high definition switched digital video (SDVHD) has no limit, and adult on demand (AOD) has a limit of 15 Mbps. In FIG. 12C, allocation techniques are depicted. Here, service groups 1, 2, and 3 are to be allocated via a so-called Tertis technique while service groups 4, 5, and 6 are to be allocated by a stacking technique.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 11:
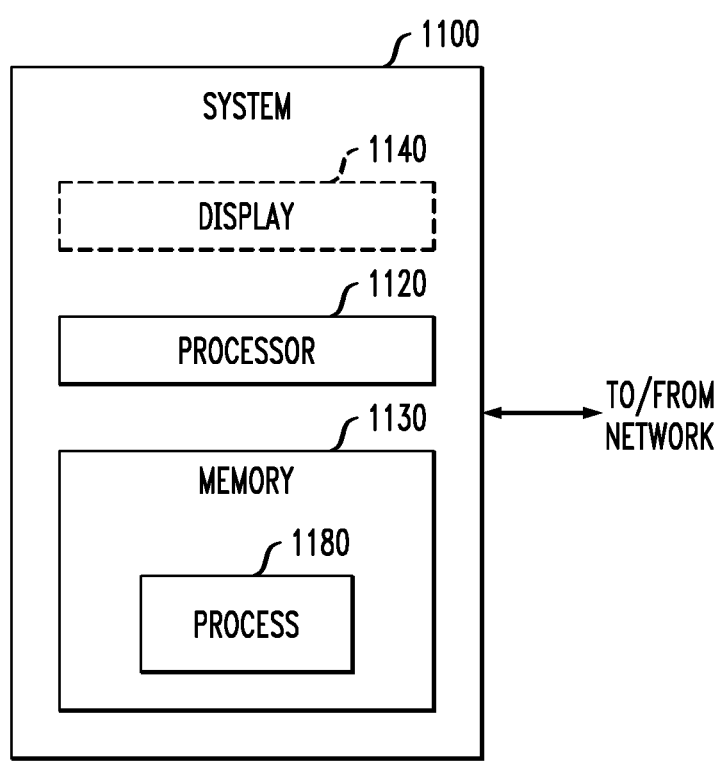
FIG. 11 is a block diagram of an exemplary computer system useful in implementing at least a portion of one or more embodiments of the invention.

FIG. 11 is a block diagram of a system 1100 that can implement part or all of one or more aspects or processes of the present invention, processor 1120 of which is representative of processors associated with servers, clients, and other elements with processing capability depicted in the other figures. In one or more embodiments, inventive steps are carried out by one or more of the processors in conjunction with one or more interconnecting network(s).

As shown in FIG. 11, memory 1130 configures the processor 1120 to implement one or more aspects of the methods, steps, and functions disclosed herein (collectively, shown as process 1180 in FIG. 11). The memory 1130 could be distributed or local and the processor 1120 could be distributed or singular. The memory 1130 could be implemented as an electrical, magnetic or optical memory, or any combination of these or other types of storage devices. It should be noted that if distributed processors are employed, each distributed processor that makes up processor 1120 generally contains its own addressable memory space. It should also be noted that some or all of computer system 1100 can be incorporated into an application-specific or general-use integrated circuit. For example, one or more method steps could be implemented in hardware in an ASIC rather than using firmware. Display 1140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 1100 as shown in FIG. 11) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules for the SRM/GSRM, to perform the method steps in FIG. 10, and so on). The method steps can then be carried out using the distinct software modules of the system, as described above, executing on the one or more hardware processors (e.g., a processor or processors in the set-top terminal and a processor or processors in the head end or other network node). Further, a computer program product can include a tangible computer-readable recordable storage medium with code adapted to be executed to carry out one or more method steps described herein, including the provision of the system with the distinct software modules.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, and the like. Note that EBIF would typically only be employed in connection with a set-top box. RTSP and/or RPC can be employed for interface protocols, for example.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    receiving, from a first one of a plurality of terminals in a service group of a video content network, a first request to establish a first category of session with a head end of said video content network, the first category being indicative of first video and data services comprising a first one of video on demand, switched digital video, gaming, and file download;
    receiving, from a second one of said plurality of terminals in said service group of said video content network, a second request to establish a second category of session with said head end of said video content network, the second category being indicative of second video and data services comprising a second one of video on demand, switched digital video, gaming, and file download, wherein said video content network provides at least said first and second different categories of sessions to said service group;
    responsive to an evaluation of said first request against a policy, said policy specifying a maximum utilization threshold for sessions of said first category as a maximum allowable number of said sessions of said first category and a maximum utilization threshold for sessions of said second category as a maximum allowable number of said sessions of said second category, said evaluation indicating that granting said first request would not cause said maximum allowable number of said sessions of said first category to be exceeded, granting, by a session resource manager apparatus, said first request; and responsive to an evaluation of said second request against said policy, said evaluation indicating that granting said second request would indeed cause said maximum allowable number of said sessions of said second category to be exceeded, denying, by said session resource manager apparatus, said second request.

2. The method of claim 1, wherein said granting of said request comprises allocating resources of said video content network to establish said requested session.

3. The method of claim 1, wherein said policy is selected to favor said first category of session over said second category of session.

4. The method of claim 1, further comprising:
dynamically pricing said first and second categories of sessions, based upon a current traffic level; and
advising a human viewer associated with said session request, in real time, of said dynamic pricing.

5. The method of claim 1, wherein said steps are carried out by a session resource manager, further comprising setting said policy by updating a data file in communication with said session resource manager.

6. The method of claim 1, further comprising tearing down at least one currently-in-progress session, in order to enable granting said request.

7. The method of claim 1, further comprising repetitively carrying out said receiving and evaluating steps, without said granting step, for a predetermined time, prior to implementing said policy, in order to determine correct functioning of said policy.

8. A session resource manager apparatus configured to communicate over a video content network with a plurality of terminals in a service group of the video content network, the video content network having a head end, said apparatus comprising:
a memory; and
at least one processor, coupled to said memory, and operative to:
receive, from a first one of a plurality of terminals in a service group of a video content network, a first request to establish a first category of session with a head end of said video content network, the first category being indicative of first video and data services comprising a first one of video on demand, switched digital video, gaming, and file download;
receive, from a second one of said plurality of terminals in said service group of said video content network, a second request to establish a second category of session with said head end of said video content network, the second category being indicative of second video and data services comprising a second one of video on demand, switched digital video, gaming, and file download, wherein said video content network provides at least said first and second different categories of sessions to said service group;
responsive to an evaluation of said first request against a policy, said policy specifying a maximum utilization threshold for sessions of said first category as a maximum allowable number of said sessions of said first category and a maximum utilization threshold for sessions of said second category as a maximum allowable number of said sessions of said second category, said evaluation indicating that granting said first request would not cause said maximum allowable number of said sessions of said first category to be exceeded, grant said first request; and responsive to an evaluation of said second request against said policy, said evaluation indicating that granting said second request would indeed cause said maximum allowable number of said sessions of said second category to be exceeded, deny said second request.

9. The session resource manager apparatus of claim 8, wherein said at least one processor is operative to grant said request by allocating resources of the video content network to establish said requested session.

10. The session resource manager apparatus of claim 8, wherein said policy is selected to favor said first category of session over said second category of session.

11. The session resource manager apparatus of claim 8, wherein said at least one processor is further operative to
dynamically price said first and second categories of sessions, based upon a current traffic level; and
facilitate advising a human viewer associated with said session request, in real time, of said dynamic pricing.

12. The session resource manager apparatus of claim 8, wherein said at least one processor is further operative to facilitate tearing down at least one currently-in-progress session, in order to enable granting said request.

13. A system comprising:
a video content network;
a head end coupled to said video content network;
a service group coupled to said video content network and having a plurality of terminals; and
a session resource manager apparatus coupled to said video content network, said session resource manager apparatus in turn comprising:
a memory; and
at least one processor, coupled to said memory, and operative to:
receive, from a first one of a plurality of terminals in a service group of a video content network, a first request to establish a first category of session with a head end of said video content network, the first category being indicative of first video and data services comprising a first one of video on demand, switched digital video, gaming, and file download;
receive, from a second one of said plurality of terminals in said service group of said video content network, a second request to establish a second category of session with said head end of said video content network, the second category being indicative of second video and data services comprising a second one of video on demand, switched digital video, gaming, and file download, wherein said video content network provides at least said first and second different categories of sessions to said service group;
responsive to an evaluation of said first request against a policy, said policy specifying a maximum utilization threshold for sessions of said first category as a maximum allowable number of said sessions of said first category and a maximum utilization threshold for sessions of said second category as a maximum allowable number of said sessions of said second category, said evaluation indicating that granting said first request would not cause said maximum allowable number of said sessions of said first category to be exceeded, grant said first request; and responsive to an evaluation of said second request against said policy, said evaluation indicating that granting said second request would indeed cause said maximum allowable number of said sessions of said second category to be exceeded, deny said second request.

14. The system of claim 13, wherein said at least one processor is operative to grant said request by allocating resources of the video content network to establish said requested session.

15. The system of claim 13, wherein said policy is selected to favor said first category of session over said second category of session.

16. The system of claim 13, wherein said at least one processor is further operative to dynamically price said first and second categories of sessions, based upon a current traffic level; and facilitate advising a human viewer associated with said session request, in real time, of said dynamic pricing.

17. The system of claim 13, wherein said at least one processor is further operative to facilitate tearing down at least one currently-in-progress session, in order to enable granting said request.

* * * * *